INVENTOR
CURT MENGES

United States Patent Office 3,315,687
Patented Apr. 25, 1967

3,315,687
FILTER INSERT FOR CIGARETTE HOLDERS
AND THE LIKE
Curt Menges, 9 Schmidtgasse, Gelnhausen, Germany
Filed July 14, 1964, Ser. No. 382,537
Claims priority, application Germany, Mar. 5, 1964,
M 60,166
4 Claims. (Cl. 131—261)

The present invention generally appertains to improvements in a filter insert for cigarette and cigar holders and for pipe stems and more particularly relates to novel improvements in a disposable filter cartridge for use in a holder for cigarettes, cigars and the like and for use in the stem of a pipe.

Filter means are known for removing, at least, some of the toxic components of tobacco smoke and for cooling down such smoke on its way from where it originates to its ultimate designation in the smoker's mouth. Various filters and inserts have been proposed for this purpose. For example, it is generally known to provide cigars directly with a filter which functions to hold back part of the toxic substances. In connection with cigar or cigarette holders and in tobacco pipes, it is also known to use filter inserts which are filled with various materials and by themselves or in addition to the filter provided directly on the cigar effect further filtration of the tobacco smoke.

Also, filters are known which contain moisture. In such filters, an absorbent material, generally soaked in water, is assembled in packaged form so as to be dispensed for ready use. It has also been proposed to seal substances soaked with moisture in a filter and clear them only immediately prior to use to enable the smoke to pass therethrough.

Of course, hookahs have been in use for years but such cannot be carried about by the smoker. In addition, the provision of liquid filtering means in a holder is also known in the art.

The present invention has for its primary object to provide a disposable filter cartridge for use in a holder for cigarettes or cigars and for use in a pipe stem, the filter cartridge using water as a filter liquid to which suitable substances may be added, if desired. The difficulty, with using a liquid filter insert or disposable filter cartridge, which is positioned axially within a holder or within a pipe stem, resides in the fact that the holder or pipe stem will not always be held in a horizontal position so that the possibility of the filter liquid accidentially running out would be present.

An important object of the present invention is to provide a disposable filter cartridge which employs a filtering liquid and which is constructed in such a manner that the smoke must pass through the filtering liquid from the burning tobacco in its passage to the smoker's mouth, so that the smoke is filtered and cooled, but so that, irrespective of the horizontal or vertical position, in which the holder or pipe stem may be held, it is not possible for the filtering liquid to leak out.

The foregoing and ancillary objects, including the provision of a compact, efficient and inexpensive disposable filter cartridge, are attained by this invention, the preferred embodiment of which is set forth in the following description and illustrated in the accompanying drawing, wherein.

Figure 1:
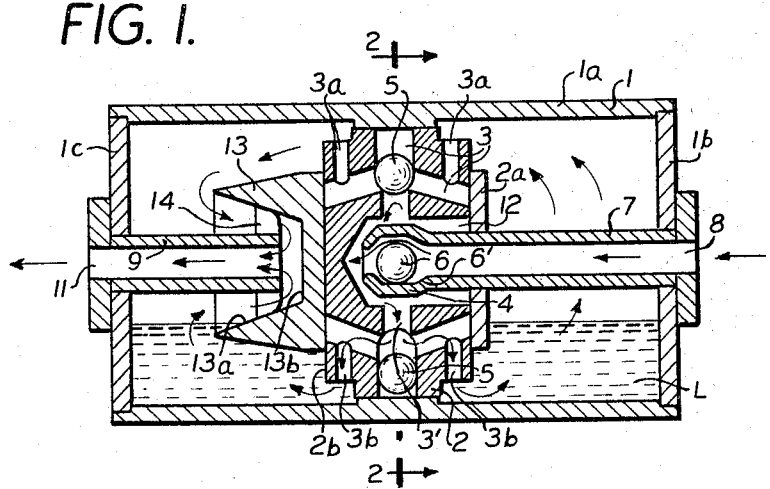
FIGURE 1 is a longitudinal sectional view of a disposable filter cartridge constructed in accordance with the present invention.
Figure 2:
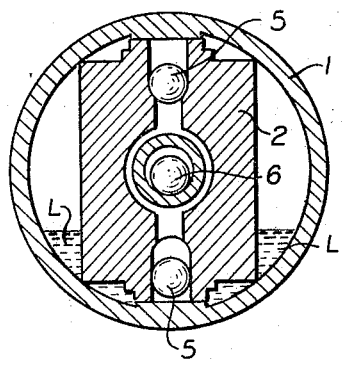
FIGURE 2 is a transverse, cross-sectional view taken substantially on the line 2—2 of FIGURE 1; and, FIGURE 3 is a schematic view showing the disposable filter cartridge incorporated in a cigarette holder.

With more particular reference to FIGURES 1 and 2, the filter insert or disposable filter cartridge of the present invention comprises a jacket or casing 1, which is composed of a side wall 1a and opposing inner and outer closed end walls 1b and 1c, respectively. The casing 1 is formed from any suitable liquid and smoke impervious material.

A solid liquid and smoke impervious block 2 is disposed transversely within the jacket or casing 1 and is spaced from the inner end wall 1b and from the outer end wall 1c and is provided with an inner side wall 2a and an outer side wall 2b.

The block is formed with a valved passageway system, which is in communication with a chamber 12 that is formed in the block at the inner side 2a thereof. The valve passage system comprises a pair of radially extending passageways 3 and 3', which communicate with the chamber 12 and extend in opposite directions, as shown in FIGURE 2. The passageways 3 and 3' are further made-up of lateral extensions which terminate in outlets 3a and 3b. The passageways are controlled by gravitationally controlled check valves, in the form of the balls 5, which are free to move in the radial passageways 3 and 3' so as to close off the passageways, depending upon whether the passageway is facing upwardly or facing downwardly.

Thus, for example, as shown in FIGURES 1 and 2, the passageway 3 is closed off by one ball 5 because it faces upwardly and the ball is free to fall gravitationally into a seated position and close off the passageway and its lateral branches, while the other ball 5 is unseated so that the passageway 3' is open for the passage of smoke therethrough, as indicated by the arrows in FIGURE 1.

The casing or jacket 1 is partly filled with water or other suitable filtering liquid, indicated by the reference character L.

Means is provided for insuring the direct passage of the smoke into the chamber 12 from the inner end 1b of the casing. Such means includes the provision of an intake opening 8 in the inner end wall 1b and an intake tube 7 is sealingly inserted in the opening 8 with the tube or conduit 7 constituting a passageway means that is in communication with an opening in the inner end 1b of the casing and which terminates within the chamber 12. The conduit 7 terminates within the chamber 12 in an enlarged end portion 4, within which a ball check valve 6 is disposed. The ball valve 6 is adapted to fall back onto the seat 6' of the enlarged end portion 4, when the cartridge is in a vertical or substantially vertical position and the inner end 1b is lowermost, thereby preventing any of the liquid L from passing through or even entering the conduit 7.

It can thus be seen, from a consideration of the arrows in FIGURE 1 that the smoke is conveyed directly by the passageway means into the chamber 12 and from the chamber 12 passes into the interior of the casing, the passage of the smoke, being either through the passageways 3 or 3', dependent upon which is uppermost and which is lowermost. The smoke then travels through the liquid L and means is provided for exhausting the smoke, after its passage through the filtering liquid L, from the cartridge.

The outlet means for the filtered smoke comprises a funnel-shaped member 13 which has its base or flat side fixed to the outer side 2b of the block, so that its concave side or the cavity 13a faces toward the outer end 1c of the casing. The outer end 1c is formed with an outlet opening 11 and an outlet conduit 9 is in sealing communication with the outlet opening 11 at the outer end of the conduit 9. The opposing or inner end of the conduit 9 is attached to a series of radial, spider-like ribs 14, which are attached to the inner wall 13a, as shown in FIGURE 1.

Thus, the smoke, as indicated by the arrows in FIGURE 1, passes out from the filtering liquid L (it being born in mind that there is a suction at the outer end of the conduit 9 because of the puffing by the smoker on the holder within which the cartridge is disposed) and is drawn through the ribs 14, which with the inner end of the conduit 9 are spaced from the wall 13b of the cavity. The smoke then passes through the outlet conduit 9.

Figure 3:
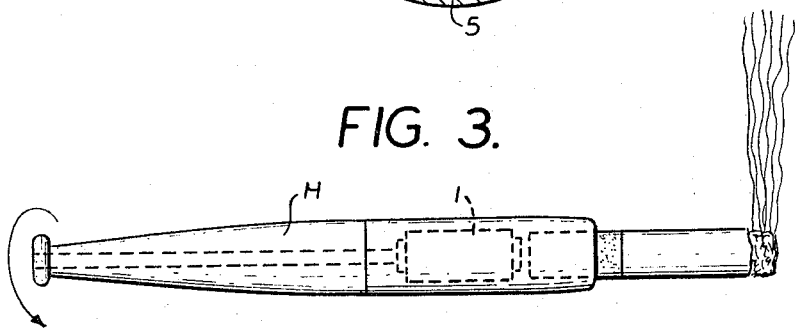

The casing 1 is disposed coaxially within a holder, such as the holder H of FIGURE 3. As indicated by the arrow, in FIGURE 3, the holder is subject to frequent rotation in the hands of a smoker. However, because of the arrangement of the passageways 3 and 3', with their associated check valves, there is no possibility that the liquid L will enter the chamber 12 and, in any position, smoke can be easily drawn through the conduit 7 and either the passageways 3 or 3' and through the liquid L and then out through the outlet means.

The aforedescribed particular arrangement of the inlet means and the outlet means, in structural association with the block, which is formed with the passageways and the check valve assemblies, insures that the cigarette holder or the like incorporating the filter cartridge may be held in any desired position without incurring any danger of the water L or other filtering liquid leaking from the casing 1.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A disposable filter cartridge for placement in the stem of a cigarette or cigar holder or a pipe comprising a hollow liquid and smoke impervious casing having a side wall and opposing closed inner and outer end walls and within which a quantity of filtering liquid is sealingly contained for use as a filtering medium through which smoke must pass, a solid smoke and liquid impervious block member mounted transversely in the casing and spaced from the end walls, said inner end wall having a smoke intake opening, said block having an inner side facing the inner end wall and an outer side facing the outer end wall, said inner side being formed with a chamber, passage means connected sealingly with the intake opening and having a end portion communicating with the chamber for the delivery of smoke from the intake opening directly to the chamber, check valve means in said passage means adapted to close off the passage means when said casing is in substantial vertical positions with the inner end facing downwardly, said block having passageways extending radially in directly opposing directions from communicating relation with the chamber to the exterior of the block and to communication with the interior of the casing, gravity controlled check valve means operatively disposed in said passageways, said passageway check valve means being opened or closed dependent upon whether its associated passageway is facing upwardly or downwardly, said outer end wall having a smoke outlet opening and outlet means connected between the outlet opening and the outer side of the block for the direct exit of smoke from the casing after the smoke has passed from the chamber through one of the passageways into and through the filtering liquid.

2. The invention of claim 1, wherein said outlet means comprises a conduit connected at one end to the outlet opening, a funnel-shaped member provided on the outer face of the block and a series of ribs provided on the inner wall of said funnel-shaped member and the conduit being connected at its other end to the ribs.

3. The invention of claim 1, wherein said passage means includes a conduit having an enlarged end portion disposed within the chamber with said check valve means operatively disposed in said end portion.

4. The invention of claim 1, wherein each of said passageways include a radial passage directly extending from the chamber and having its outer end sealed off by the side wall of the casing and having the check valve means disposed operatively therein and having lateral ports extending forwardly and rearwardly from the vicinity of the check valve means and in communication with the radial passage, said ports terminating in radial outlets which are in communication with the interior of the casing.

References Cited by the Examiner

UNITED STATES PATENTS 3,057,362   10/1962   Flint _____ 131—173
3,125,100   3/1964   Jany _____ 131—173 X

FOREIGN PATENTS 67,359   1/1915   Austria.
11,204   5/1909   Great Britain.
19,132   8/1910   Great Britain.

SAMUEL KOREN, *Primary Examiner.*

JOSEPH S. REICH, *Examiner.*